United States Patent
Hashiguchi et al.

(10) Patent No.: US 8,926,787 B2
(45) Date of Patent: Jan. 6, 2015

(54) SURFACE-MODIFIED FILM, PROCESS FOR PRODUCING SAME, AND LAMINATED FILM AND PROCESS FOR PRODUCING SAME

(75) Inventors: Shinji Hashiguchi, Izumiotsu (JP);
Kazutaka Hirano, Izumiotsu (JP);
Tomotsugu Fujimoto, Izumiotsu (JP)

(73) Assignee: Stella Chemifa Corporation, Osaka-Shi (JP)

( * ) Notice: Subject to any disclaimer, the term of this patent is extended or adjusted under 35 U.S.C. 154(b) by 24 days.

(21) Appl. No.: 13/499,648

(22) PCT Filed: Sep. 17, 2010

(86) PCT No.: PCT/JP2010/066127
§ 371 (c)(1),
(2), (4) Date: Mar. 30, 2012

(87) PCT Pub. No.: WO2011/043179
PCT Pub. Date: Apr. 14, 2011

(65) Prior Publication Data
US 2012/0186650 A1    Jul. 26, 2012

(30) Foreign Application Priority Data
Oct. 7, 2009 (JP) ................................. 2009-233730

(51) Int. Cl.
| | |
|---|---|
| C09J 5/02 | (2006.01) |
| C09J 5/00 | (2006.01) |
| C08J 7/12 | (2006.01) |
| C09J 1/00 | (2006.01) |
| C09J 7/00 | (2006.01) |
| B32B 7/04 | (2006.01) |
| B32B 7/10 | (2006.01) |
| B32B 27/16 | (2006.01) |
| B32B 27/30 | (2006.01) |

(52) U.S. Cl.
CPC .... *C08J 7/12* (2013.01); *C09J 1/00* (2013.01); *C09J 5/00* (2013.01); *C09J 5/02* (2013.01); *C09J 7/00* (2013.01); *B32B 7/04* (2013.01); *B32B 7/10* (2013.01); *B32B 27/16* (2013.01); *B32B 27/304* (2013.01); *B32B 27/306* (2013.01); *B32B 2250/02* (2013.01); *B32B 2250/24* (2013.01); *B32B 2457/12* (2013.01)
USPC .............................. 156/325; 135/256; 156/60

(58) Field of Classification Search
USPC ..................................... 136/256; 156/60, 325
See application file for complete search history.

(56) References Cited

U.S. PATENT DOCUMENTS

| | | | | |
|---|---|---|---|---|
| 3,122,445 A | * | 2/1964 | Osborn | .................... 427/255.38 |
| 4,091,166 A | | 5/1978 | Kubacki | |

(Continued)

FOREIGN PATENT DOCUMENTS

| | | |
|---|---|---|
| DE | 1769060 A1 | 8/1971 |
| GB | 923846 A1 | 4/1963 |

(Continued)

OTHER PUBLICATIONS

Machine translation of JP 06-340759 A, retrieved Jun. 27, 2013.*

(Continued)

*Primary Examiner* — Michael Orlando
(74) *Attorney, Agent, or Firm* — Law Office of Katsuhiro Arai

(57) ABSTRACT

It is an object of the present invention to provide a surface-modified film which has adhesive properties improved by surface modification and a process for producing the same. It is also an object of the present invention to provide a laminated film in which at least the surface-modified film has been laminated and a process for producing the laminated film. The surface-modified film according to the present invention is characterized by being obtained by bringing a halide complex of an element in Group 13 of the periodic table into contact with at least a part of a region in the surfaces of a resin film.

5 Claims, 1 Drawing Sheet

(56) References Cited

U.S. PATENT DOCUMENTS

| | | | |
|---|---|---|---|
| 4,394,205 | A | 7/1983 | Blenner |
| 6,117,497 | A | 9/2000 | Murahara et al. |
| 6,689,426 | B1 | 2/2004 | Murahara et al. |
| 2009/0281238 | A1* | 11/2009 | Hidaka et al. ............ 524/588 |

FOREIGN PATENT DOCUMENTS

| | | |
|---|---|---|
| JP | 54-020077 A | 2/1979 |
| JP | 59-192564 A1 | 10/1984 |
| JP | 04-149243 A1 | 5/1992 |
| JP | 06-340759 A | 12/1994 |
| JP | 2006-156873 A1 | 6/2006 |

OTHER PUBLICATIONS

Masanori Fujii, et al., "Development of Adhesive Technology for PTFE on Metal Substances-Surface Modification of PTFE by Plasma Etching Treatment-", Mitsubishi Cable Industries Review, Jul. 2002, vol. 99, pp. 78-84.

Shinji Saito, et al., "An Improvement of Sealant Adhesion by Using Corona Discharge Treatment; Part 1: Improvement of the Adhesion of Sealant to Fluoride Paint," Collection of Lecture Digests of Architectural Institute of Japan (Kyushu), Sep. 1998, pp. 275-276.

Extended European Search Report (EESR) mailed Mar. 19, 2013, issued in corresponding European Application No. EP 10821850.4.

English Translation of International Preliminary Report on Patentability Chapter I (IB/373) dated May 8, 2012.

Edward M. Liston, "Plasma Treatment for Improved Bonding: A Review," J. Adhesion, 1989, vol. 30, pp. 199-218.

Takashi Iwama, et al., "Study on Improvement of Adhesion Characteristics on Surface of Resin-Establishment of the method for processing minute surface using cold plasma processing-", Report of the Yamanashi Industrial Technology Center, No. 21(2007), pp. 99-102.

The International Search Report (ISR) mailed on Nov. 2, 2010, issued by the Japanese Patent Office for International Patent Application PCT/JP2010/066127.

* cited by examiner (a)

(b)

SURFACE-MODIFIED FILM, PROCESS FOR PRODUCING SAME, AND LAMINATED FILM AND PROCESS FOR PRODUCING SAME

This application is the U.S. National Phase under 35 U.S.C. §371 of International Application PCT/JP2010/066127, filed Sep. 17, 2010, which claims priority to Japanese Patent Application No. 2009-233730, filed Oct. 7, 2009. The International Application was published under PCT Article 21(2) in a language other than English.

TECHNICAL FIELD

The present invention relates to a surface-modified film which has adhesive properties improved by surface modification and a process for producing the surface-modified film. The present invention also relates to a laminated film in which at least the surface-modified film has been laminated and a process for producing the laminated film.

BACKGROUND ART

As a solar cell backsheet material, fluorine resin films (e.g. polyvinyl fluoride (PVF) films) and polyethylene terephthalate (PET) films to which aluminum foil lamination, aluminum vapor deposition or Si vapor deposition is applied have been used in view of improvement in the weather resistance and gas barrier properties. Humidity-sensitive solar cells are protected from moisture by providing such a backsheet.

Among the backsheet materials described above, a fluorine resin film is superior from the viewpoint of its long-term durability. Therefore, a growing demand for such fluorine resin films as the backsheet material has risen. However, there are problems that adhesive properties of the material consisting of the fluorine resin having a C—F bond are generally poor because such material has a small surface energy, resulting in showing water- and oil-repellent properties.

The technology that improves the adhesive properties of such a fluorine resin film includes, for example, plasma discharge processing, corona discharge processing, flame processing, blast processing, and the like (cf., e.g., the following non-patent documents 1 to 4). These surface modification technologies have improved the adhesive properties by introducing a hydrophilic functional group (e.g., —COOH group, —OH group, $SO_3H$ group, $SO_2F_x$ group, etc.) into the resin surface.

However, the above processing method will require a large-scale apparatus, leading to an increase in production costs. In addition, there is also a problem that the adhesive properties cannot be maintained for a long period of time because of significant aging after the surface modification.

PRIOR ART DOCUMENTS

Non-Patent Documents

Non-patent document 1: Plasma Treatment for Improved Bonding: A Review, J. Adhesion, 1989, vol. 30, Edward M. Liston, pp. 199-218
Non-patent document 2: Masanori Fujii, et al., "Development of Adhesive Technology for PTFE on Metal Substances-Surface Modification of PTFE by Plasma Etching Treatment-", MITSUBISHI CABLE INDUSTRIES REVIEW, 2002, July, vol. 99, p. 78-84
Non-patent document 3: Shinji Saito, et al., "Improvement of The Adhesion of Sealant to Fluoride Paint", Summaries of Technical Papers of Annual Meeting, Architectural Institute of Japan, 1998, September, p. 275-276
Non-patent document 4: Takashi Iwama, et al., "Study on Improvement of Adhesion Characteristics on Surface of Resin—Establishment of the method for processing minute surface using cold plasma processing-", Report of the Yamanashi Industrial Technology Center, No. 21 (2007), p. 99-102

SUMMARY OF THE INVENTION

Problems to be Solved by the Invention

The present invention has been made in view of the problems described above, and it is an object of the present invention to provide a surface-modified film which has adhesive properties improved by surface modification and a process for producing the same. It is also an object of the present invention to provide a laminated film in which at least the surface-modified film has been laminated and a process for producing the laminated film. It is a further object of the present invention to provide a solar cell backsheet comprising a surface-modified film or a laminated film obtained by the process described above.

Means for Solving the Problem

The present inventors have studied on surface-modified films and a process for producing the same, laminated films and a process for producing the same, and solar cell backsheets in order to solve the above conventional problems. As a result, the present inventors have found that the above-mentioned objects can be achieved by adopting the following constitution, and have accomplished the present invention.

That is, the surface-modified film according to the present invention is characterized by being obtained by bringing a halide complex of an element in Group 13 of the periodic table into contact with at least a part of a region in the surfaces of a resin film so as to solve the problems described above.

According to the above constitution, the surface-modified film of the present invention is improved in adhesive properties in at least a part of the region in the surfaces by bringing at least a part of the region in the surfaces of the resin film into contact with a halide complex of an element in Group 13 of the periodic table. Even after the passage of a long time (allowed to stand), the surface-modified film of the present invention can maintain a high adhesive property and its aging is more suppressed compared to surface-modified films to which, for example, plasma processing or corona discharge processing, flame processing, blast processing, etc. have been applied.

In the above constitution, the resin film is preferably formed by at least any one selected from the group consisting of fluorine resin, polymethyl methacrylate, polyethylene terephthalate, polyethylene naphthalate, polybutylene terephthalate, polycyclohexane dimethanol terephthalate, polycarbonate, ethylene-vinyl acetate copolymer, polyolefin-based resin, polyvinyl butyral, and polyimide.

In addition, in order to solve the above problems, the process for producing a surface-modified film according to the present invention comprises bringing a halide complex of an element in Group 13 of the periodic table into contact with at least apart of a region in the surfaces of a resin film, thereby to produce a surface-modified film improved in adhesive properties in a part of the region in the surfaces.

According to the above constitution, the process for producing a surface-modified film of the present invention is performed by bringing a halide complex of an element in Group 13 of the periodic table into contact with at least a part of the region in the surfaces of a resin film, so that an improvement in adhesive properties in a part of the region in the surfaces becomes possible. The contact of the halide complex of an element in Group 13 can enable to maintain a high adhesive property as well as seek to suppress the aging process even after the passage of a long time (allowed to stand), compared with surface modification processes such as plasma processing or corona discharge processing, flame processing, blast processing, etc. Moreover, since the surface modification of the resin film can be easily attained for a short time without the need for large-scale apparatuses compared with each conventional processing described above, long and large-scale production facilities become unnecessary and thus production efficiency is improved, resulting in the reduction of production costs.

In order to solve the problems described above, the laminated film according to the present invention is characterized by being a laminated film formed by laminating at least two sheets of resin films, wherein at least one of the two sheets of resin films is a surface-modified film obtained by bringing into contact with a halide complex of an element in Group 13 of the periodic table and the surface having been brought into contact with the halide complex of an element in Group 13 is bonded as a mating surface to the other resin film.

Because the laminated film according to the present invention comprises a surface-modified film having adhesive properties improved in a part of a region in the surfaces of a resin film by bringing a halide complex of an element in Group 13 of the periodic table into contact with at least a part of the region in the surfaces, it has a laminated structure that is excellent in adherence to the other resin film. In addition, when the laminated film of the present invention is compared with the conventional surface-modified films, the high adhesive properties can be maintained and the reduction of peeling due to the aging process can be attained, even after the passage of a long time (allowed to stand) because such an improvement of the adhesive properties is caused by the surface modification through the contact of the halide complex of an element in Group 13, not through the conventional surface modification processing such as plasma processing, corona discharge processing, flame processing or blast processing, etc.

In the above constitution, the surface-modified film and the other resin are preferably laminated with an adhesive interposed therebetween. It is possible to further improve the adhesive properties between the surface-modified film and the other resin film by the lamination with an adhesive interposed therebetween.

Moreover, in the above constitution, the resin film is preferably formed by at least any one selected from the group consisting of fluorine resin, polymethyl methacrylate, polyethylene terephthalate, polyethylene naphthalate, polybutylene terephthalate, polycyclohexane dimethanol terephthalate, polycarbonate, ethylene-vinyl acetate copolymer, polyolefin-based resin, polyvinyl butyral, and polyimide.

In addition, in order to solve the above problems, the process for producing a laminated film according to the present invention is a process for producing a laminated film wherein at least two sheets of resin films are laminated, comprising the steps of: surface-treating by bringing a halide complex of an element in Group 13 of the periodic table into contact with at least a part of a region in the surfaces of at least one of the two sheets of resin films, thereby to form a surface-modified film having adhesive properties improved in the region, and bonding the surface-modified film and the other resin film together so that the surface having been brought into contact with the halide complex of an element in Group 13 is bonded as a mating surface.

According to the above constitution, adhesive properties of the surface can be improved by bringing a halide complex of an element in Group 13 of the periodic table into contact with at least a part of the region in the surfaces of at least one sheet of resin film. Moreover, in the bonding step, the surface improved in the adhesive properties is bonded as a mating surface to the other resin film. In this way, adhesive properties of a mating surface can be improved by surface modification comprising bringing a halide complex of an element in Group 13 into contact with the mating surface, enabling the production of highly reliable laminated films. Further, surface modification by the contact with a halide complex of an element in Group 13 can maintain a high adhesive property and suppress the aging process even after the passage of a long time (allowed to stand) when compared to the conventional surface modification processing such as plasma processing, corona discharge processing, flame processing or blast processing, etc. Moreover, since such a surface modification of the resin film can be easily attained for a short time without the need for large-scale apparatuses, long and large-scale production facilities become unnecessary and production efficiency is improved, resulting in the reduction of production costs.

In the above constitution, the bonding step is preferably performed using an adhesive. It is possible to further improve the adhesive properties between the surface-modified film and the other resin film by lamination with an adhesive interposed therebetween.

In addition, in the above constitution, at least either of the two sheets of resin films is ethylene-vinyl acetate copolymer film, and the bonding step is preferably performed without using an adhesive.

In addition, the solar cell backsheet according to the present invention is characterized by its structure comprising a laminated film obtained by the process for producing a laminated film described above, in order to solve the above problems.

Since the adhesive properties of the surface-modified film described above are improved by the surface modification due to the contact with the halide complex of an element in Group 13, it is possible to form a laminated film by bonding the films to each other. Moreover, this laminated film can be used as a solar cell backsheet. Since the adhesive properties imparted by such treatment can be maintained for a long time of period, product reliability can be improved because of the excellent process control.

Effect of the Invention

According to the present invention, it becomes possible to improve the adhesive properties to the other resin film by performing the surface modification due to contact with a halide complex of an element in Group 13 of the periodic table. In addition, the surface modification through contact with a halide complex of an element in Group 13 can more suppress the aging process of the adhesive properties, compared to the conventional plasma processing, corona discharge processing, flame processing or blast processing, etc. In this way, high adhesive properties can be maintained even after the passage of a long time (allowed to stand). As a result, it becomes possible to produce a highly reliable laminated film. Also, long and large-scale production facilities will become unnecessary and reduction in production costs will be able to be achieved due to the improved production efficiency because the surface modification of the resin film can be performed for a short time without the need for large-scale production apparatuses. In addition, the surface-modified film and the laminated film comprising said surface-modified film according to the present invention can be suitably applied to, for example, solar cell backsheets, etc.

BRIEF DESCRIPTION OF THE DRAWINGS

FIG. 1(a) represents an aspect wherein a surface-modified film and the other resin film are laminated; and FIG. 1(b) represents an aspect wherein a surface-modified film and the other resin film are laminated with an adhesive interposed therebetween.

EMBODIMENTS FOR CARRYING OUT THE INVENTION

Figure 1:
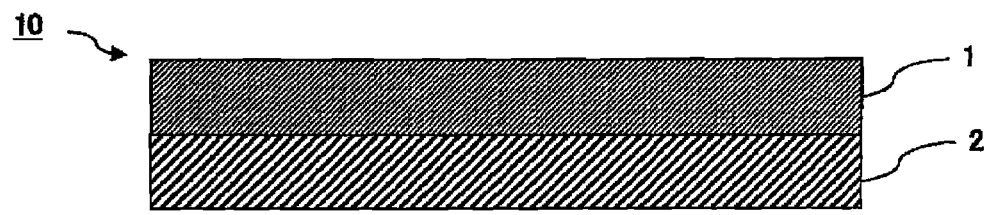
FIG. 1 is a laminated film according to an embodiment of the present invention.
Figure 1:
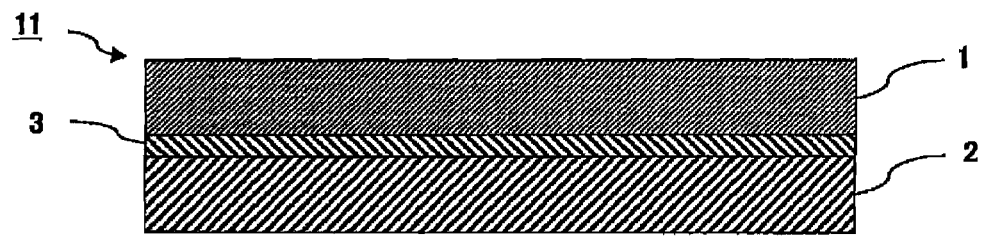

The surface-modified film of the present invention will be described below using an example of a laminated film which has been laminated with the other resin film.

The laminate film according to an embodiment of the present invention is a laminated film 10 wherein at least two sheets of resin films are laminated and at least one of the resin films may be a surface-modified film 1 which is surface-modified by bringing into contact with a halide complex of an element in Group 13 of the periodic table (details will be explained later). The region which is surface-modified due to the contact with the complex may be whole surfaces of the resin film or may be a part of a region in the surfaces. In addition, the mating surface to the other resin film 2 is the surface-modified surface described above. Moreover, the other resin film 2 to be bonded to the surface-modified film may be surface-modified by the contact with the complex.

The resin film may be a monolayer or may be a laminated structure wherein at least two films are laminated. In this case, the laminated film may consist of heterogeneous or homogeneous materials. In addition, the thickness of the resin film (a total thickness in the case of a laminated structure) is not particularly limited, but is preferably in the range of, for example, 1 to 2000 μm. In this case, the thickness of the resin films to be bonded may be different from each other. Moreover, the planar shape of the resin film is not particularly limited, and may be set appropriately as needed.

The resin film and the other resin film include, but not particularly limited to, those formed by fluorine resin, polymethyl methacrylate (PMMA), polyethylene terephthalate (PET), polyethylene naphthalate (PEN), polybutylene terephthalate (PBT), polycyclohexane dimethanol terephthalate (PCT), polycarbonate (PC), ethylene-vinyl acetate copolymer (EVA), polyolefin-based resin, polyvinyl butyral (PVB), polyimide (PI), and the like. These constituent materials may be used alone or in combination with two or more thereof.

The fluorine resin film specifically includes, for example, polyvinylidene fluoride (PVDF), polyvinyl fluoride (PVF), polychlorotrifluoroethylene (PCTFE), ethylene-chlorotrifluoroethylene copolymer (ETCFE), ethylene-tetrafluoroethylene copolymer (ETFE), tetrafluoroethylene-hexafluoropropylene copolymer (FEP), and the like. These constituent materials may be used alone or in combination with two or more thereof.

When an ethylene-vinyl acetate copolymer film is used as a resin film, it is usually preferable for an organic peroxide to be added into the film. An adhesive function occurs on the surface of the ethylene-vinyl acetate copolymer film when this organic peroxide is thermally decomposed. Accordingly, when the ethylene-vinyl acetate copolymer film is used, use of an adhesive can be omitted in the bonding step. The organic peroxide to be added includes, but not particularly limited to, for example, t-butylperoxy-2-ethylhexyl carbonate, 2,5-dimethylhexane-2,5-dihydroperoxide, 2,5-dimethyl-2,5-di(t-butylperoxy)hexane-3, di-t-butylperoxide, dicumylperoxide, 2,5-dimethyl-2,5-di(t-butylperoxy)hexane, α,α'-bis(t-butylperoxyisopropyl)benzene, n-butyl-4,4-bis(t-butylperoxy)butane, 2,2-bis(t-butylperoxy)butane, 1,1-bis(t-butylperoxy)cyclohexane, 1,1-bis(t-butylperoxy)-3,3,5-trimethylcyclohexane, t-butyl peroxybenzoate, benzoyl peroxide, and the like. Further, other additives such as silane coupling agents, antioxidants, or yellowing inhibitors may be added to the ethylene-vinyl acetate copolymer film.

The content of the organic peroxide is not particularly limited, but is preferably in the range of 0.1 to 10% by weight of the total weight of the ethylene-vinyl acetate copolymer film, more preferably in the range of 0.1 to 5% by weight. If the content of the organic peroxide is less than 0.1% by weight, sufficient adhesive properties may not be obtained even after having performed surface modification by bringing into contact with a halide complex of an element in Group 13 of the periodic table. On the other hand, if the content exceeds 10% by weight, the properties of ethylene-vinyl acetate copolymer may not be maintained.

If a fluorine resin film such as PVDF film is used as the resin film, a sufficient adhesive property may not be imparted by the surface modification through the contact to a halide complex of an element in Group 13. In that case, a film having a sufficient adhesive strength can be produced by alloying with PVF having a large effect due to the surface modification even if the adhesive strength is insufficient in a PVDF single film.

As also shown in FIG. 1(b), the present invention may be a laminated film 11 comprising lamination of a surface-modified film 1 and the other resin film 2 with an adhesive 3 interposed therebetween. The adhesive 3 is not particularly limited, and for example, urethane-based adhesives, epoxy-based adhesives, synthetic rubber-based adhesives, and the like can be used. In addition, pressure-sensitive adhesives (adhesives) can also be used. The pressure-sensitive adhesive is not particularly limited, and, for example, acrylic-based adhesives, rubber-based adhesives, urethane-based adhesives, and the like can be used.

Next, a process for producing a laminated film according to an embodiment of the present invention will be explained. The process for producing a laminated film comprises at least the steps of surface-treating a resin film by bringing into contact with a halide complex of an element in Group 13, thereby to produce a surface-modified film, and bonding the surface-modified film and the other resin film together so that the surface having been brought into contact with the complex is bonded as a mating surface.

The surface-treatment step is intended to improve adhesive properties by bringing a halide complex of an element in Group 13 into contact with the surface of a resin film. The contact of the halide complex of an element in Group 13 may be performed to all the resin films to be laminated or may be performed to only either of the resin films. In this case, the region to be brought into contact with the complex is preferably entire surfaces of the mating surface of the resin film to be bonded. However, the present invention is not limited to this embodiment and may also be an aspect comprising surface modifying only at least a part of a region in the surfaces of the resin film. In this case, a partial surface modification of the resin film can be performed by masking the predetermined region of the surface of the resin film. The masking materials used for masking are not particularly limited, except that they have heat resistance at or over a temperature of the processing, and they include those made of, for example, fluorine resins (e.g. polytetrafluoroethylene, polytetrafluorochloroethylene, polyvinyl fluoride, polyvinylidene fluoride, polydichlorodifluoroethylene, polytrifluorochloroethylene, etc.), ceramics, polyimides, polyether ether ketones (PEEK), metals, etc.

The halide complex of an element in Group 13 of the periodic table is a complex compound wherein the compound having a nucleophilic site in the molecule has been linked to an electrophilic power of an element in Group 13. The halide of an element in Group 13 includes, but not particularly limited to, for example, $BF_3$, $BCl_3$, $BBr_3$, $AlCl_3$, $InCl_3$, and the like. In addition, the compound having a nucleophilic site in the molecule is not particularly limited as far as it is stable to the halide of an element in Group 13. Specifically, water, cyclic ethers, cyclic carbonate esters, straight-chain carbonate esters, phosphate esters, straight-chain ethers, lactone compounds, straight-chain esters, carboxylic acid compounds, nitrile compounds, amide compounds, sulfone compounds, amine compounds, alcohols, and the like are exemplified.

The cyclic ether includes tetrahydrofuran, 2-methyltetrahydrofuran, and the like. The cyclic carbonate ester includes ethylene carbonate, propylene carbonate, butylene carbonate, and the like. The straight-chain carbonate ester includes dimethyl carbonate, ethyl methyl carbonate, diethyl carbonate, methyl propyl carbonate, methyl butyl carbonate, and the like. The phosphate ester includes trimethyl phosphate, triethyl phosphate, ethyl dimethyl phosphate, diethyl methyl phosphate, and the like. The straight-chain ether includes dimethoxyethane, diethyl ether, butyl ether, and the like. The lactone compound includes γ-butyrolactone and the like. The straight-chain ester includes methyl propionate, methyl acetate, ethyl acetate, methyl formate, and the like. The carboxylic acid compound includes formic acid, acetic acid, and the like. The nitrile compound includes acetonitrile and the like. The amide compound includes dimethyl formamide and the like. The sulfone compound includes sulfolane, methylsulfolane, and the like. The amine compound includes pyridine, methylethylamine, diethyl, ethylamine, benzylamine, and the like. The alcohol includes methanol, ethanol, n-propanol, iso-propanol, n-butanol, n-octanol, phenol, p-cresol, and the like.

The process for producing a halide complex of an element in Group 13 comprises bringing a halide gas of an element in group 13 into contact with a solvent composed of the compound having a nucleophilic site in the molecule. Such a contact method is not particularly limited, and includes, for example, a bubbling method, a surface absorption method for solvent, and the like. In addition, the halide complex of an element in Group 13 can also be obtained by mixing an oxide of an element in Group 13 with a hydrogen halide. Alternatively, the halide complex may be obtained by mixing a solid or liquid halide with a solvent composed of the above compound having a nucleophilic site in the molecule. In addition, the amount of the halide of an element in Group 13 to be added to the solvent is preferably in the range of 1 to 90% by weight, more preferably in the range of 30 to 80% by weight, in a solution containing the above solvent. If the added amount becomes lower than the lower limit, the surface modification of the resin film becomes insufficient, resulting in failure to improve the adhesive properties. On the other hand, if the added amount exceeds the upper limit, there is a disadvantage that the gas of the halide of an element in Group 13 volatilizes.

The process of bringing a halide complex of an element in Group 13 into contact with a resin film is not particularly limited, and may be performed by immersing the resin film in the complex or by blowing the complex to the resin film with a spray. In the case where the resin film is immersed, the immersion (processing) time is preferably one second to ten hours, more preferably ten seconds to six hours, particularly preferably ten seconds to four hours. When the immersion time is below the lower limit, surface modification of the resin film becomes insufficient, resulting in failure to improve the adhesive properties. On the other hand, the immersion time exceeds the upper limit, there is a disadvantage that the production efficiency is reduced. The temperature of the halide complex of an element in Group 13 is preferably from 0 to 100° C. and more preferably 15 to 45° C. When the temperature of the halide complex of an element in Group 13 is lower than the lower limit, surface modification of the resin film becomes insufficient, resulting in failure to improve the adhesive properties. On the other hand, if the temperature exceeds the upper limit of the temperature of the complex, the gas of the halide of an element in Group 13 may volatilize.

The resin film after surface modification can be washed with a washing solution such as water and alcohols. By this processing, unreacted halide of an element in Group 13 adsorbed on the surface of the resin film can be removed, and a highly stable adhesive surface can be formed. The washing process includes, but not particularly limited to, for example, an immersing process in a washing solution. As the washing time, it is preferably one second to two hours, more preferably ten seconds to one hour. If the washing time is lower than the lower limit, removal of the unreacted halide of an element in Group 13 adsorbed on the surface of the resin film becomes insufficient, often resulting in failure to improve the adhesive properties. On the other hand, the washing time exceeds the upper limit, there is a disadvantage that the production efficiency is reduced. In addition, for the temperature of the washing solution, any problem will not occur as far as it is the melting point or higher of the washing solution, the boiling point or lower of the washing solution and the heat-resistant temperature or lower of the resin film.

The resin film may be dried after the washing process. The drying method is not particularly limited, and includes, for example, a method where nitrogen gas is blown onto the surface of the resin film and then dried from under reduced pressure of 10 Pa to under vacuum, and a drying method under heating.

The bonding step is a step comprising producing a laminated film by bonding at least two sheets of resin films together so that the modified surface is bonded as a mating surface. The adhesive described above may be used for such bonding. However, if either of the resin films to be bonded is an ethylene-vinyl acetate copolymer film, both can be bonded together without using an adhesive.

When an urethane-based adhesive, an epoxy-based adhesive, a synthetic rubber-based adhesive or the like is used as the adhesive, thermo compression bonding may be applied to the laminate after being bonded. In this case, the heating temperature is preferably in the range of 20 to 200° C., more preferably in the range of 25 to 150° C. In addition, the pressure is preferably in the range of 0.1 to 500 kPa, more preferably in the range of 0.1 to 200 kPa. Further, the time required for the compression bonding is preferably in the range of one minute to 24 hours, though it depends on the kind of the adhesives. In addition, the compression bonding can be performed while being pressed by a pressing means such as a compression bonding roll.

The bonding method may be appropriately changed depending on the type of adhesives used. For example, if the adhesive is a liquid, a method comprising applying an adhesive to at least either of the resin films, bonding both films together, and drying the adhesive is exemplified. In this case, the application amount can be appropriately set according to the thickness of the adhesive layer after drying. Moreover, in the case of a film-like adhesive, there is exemplified a method wherein the adhesive is bonded to at least either of the resin films to be laminated and then both are bonded together.

Incidentally, if an adhesive is used, it is preferable to perform surface modification to the whole mating surfaces of the resin films to be bonded, by bringing into contact with the halide complex of an element in Group 13. The adhesive properties of both films can be more improved in this way, compared with a laminated film which is produced by bonding the surface-modified resin film to the resin film in which surface modification by the contact with the complex has not been performed.

When one of the resin films to be bonded is an ethylene-vinyl acetate copolymer film and bonding is performed without using an adhesive, preferred is a thermo compression bonding. In this case, the heating temperature is preferably in the range of 50 to 200° C., more preferably in the range of 100 to 150° C. In addition, the pressure is preferably in the range of 0.1 to 500 kPa, more preferably in the range of 0.1 to 101.3 kPa. Further, the time required for the compression bonding is preferably in the range of 10 seconds to 24 hours, more preferably in the range of 10 seconds to 60 minutes. In addition, the compression bonding can be performed while being pressed by a pressing means such as a compression bonding roll. Further, the compression bonding can also be performed using a vacuum laminator.

Figure 2:
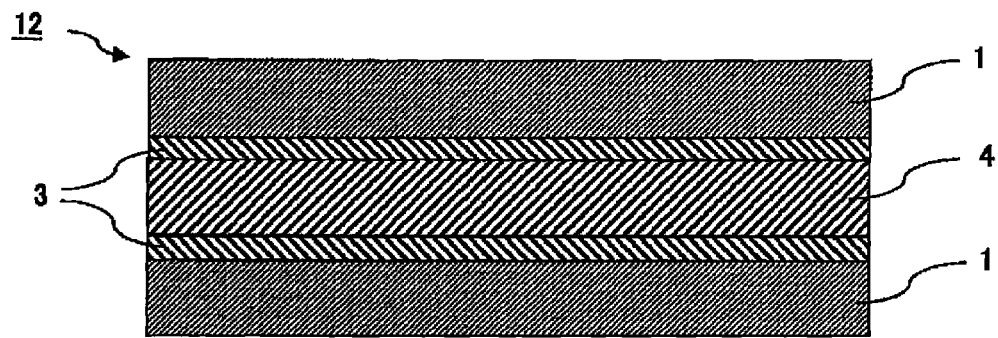
FIG. 2 is a schematic cross-sectional view showing schematically a solar cell backsheet comprising a laminated film according to an embodiment of the present invention.

The surface-modified film obtained by the methods described above or the laminated film containing the same has high adhesive properties, and thus can be appropriately applied to, for example, solar cell backsheets and the like. When these films are used for solar cell backsheets, for example, embodiments as shown in FIG. 2 are possible. That is, a surface-modified film 1 is bonded on both sides of the resin film 4 with an adhesive 3 interposed therebetween. The surface-modified film 1 has weather resistance. In this case, the surface-modified film 1 has an excellent adhesive property, because it is surface modified by the contact of the halide complex of an element in Group 13 as described above. As a result, it is possible to produce a highly reliable solar cell backsheet 12. In addition, the surface-modified film or the laminated film including the same according to the present embodiment can be applied to uses such as flexible printed circuit boards, covering materials of various insulation materials, drug-resistant, corrosion-resistant sheet materials, operation region protection materials, packaging materials for food preservation in addition to solar cell backsheets.

EXAMPLES

The preferred Examples of the present invention are illustratively described in detail below. However, the materials and the added amounts described in these Examples do not limit the scope of the present invention only to those embodiments, unless specifically stated.

Example 1

Surface modification was performed by immersing polyvinyl fluoride (PVF) film (trade name: Tedlar, manufactured by DuPont, 50 μm in thickness) in an aqueous solution of $BF_3$ complex adjusted to a concentration of 71% by weight. At this time, the immersion time was set to 10 minutes, and the temperature of the aqueous $BF_3$ complex solution was set to 25° C.

Then, the PVF film after surface modification was washed by immersing it in water with stirring for one hour. At this time, the temperature of water was set to 25° C. Subsequently, nitrogen gas was blown on the surface of the PVF film after washing and then dried under a reduced pressure of 10 Pa or less at room temperature. In this way, a surface-modified film consisting of PVF films was obtained.

In addition, the PVF film after surface modification was bonded to an untreated ethylene-vinyl acetate copolymer (EVA) film (white, manufactured by Kyoei Chemical Industries Ltd., 2 mm in thickness) by thermo compression bonding, with the surface-modified surface as a mating surface. Without using an adhesive, the bonding was performed by compression bonding at a bonding temperature of 135° C. under a pressure of 2.5 kPa for 30 minutes. The film was then removed from the apparatus and allowed to stand for spontaneous cooling. In this way, a laminated film according to this Example was produced.

Examples 2 to 14

In Examples 2 to 14, laminated films according to Examples 2 to 14 were produced in the same manner as the above Example 1, except that the surface modification of the PVF film was performed under conditions shown in Table 1 below.

Comparative Example 1

In Comparative Example 1, the PVF film was bonded to an untreated ethylene-vinyl acetate copolymer film without carrying out the surface modification with a halide complex of an element in Group 13, thereby to produce a laminated film. The bonding conditions were the same as in Example 1.

Examples 15 and 16

In Examples 15 and 16, surface modification of the PVF film was carried out under the conditions shown in Table 1 below. In addition, ethylene-vinyl acetate copolymer (EVA) film (model; 40KR, SANVIC INC., 400 μm in thickness) for solar cells was used as a film to be bonded to the PVF film after the surface modification. Laminated films according to Examples 15 and 16 were produced in the same manner as Example 1 except for the above procedure.

Comparative Example 2

In Comparative Example 2, a laminated film was produced by bonding the PVF film to an untreated EVA film for solar cells without carrying out the surface modification with a halide complex of an element in Group 13. The bonding conditions were the same as in Example 15.

Examples 17 to 19

In Examples 17 to 19, surface modification of the PVF film was carried out under the conditions shown in Table 1 below. In addition, ethylene-vinyl acetate copolymer (EVA) film (model; 45FR, manufactured by SANVIC INC., 450 μm in thickness) for solar cells was used as a film to be bonded to the PVF film after the surface modification. Laminated films according to Examples 17 to 19 were produced in the same manner as Example 1 except for the above procedure.

Comparative Example 3

In Comparative Example 3, a laminated film was produced by bonding the PVF film to an untreated EVA film for solar cells without carrying out the surface modification with a halide complex of an element in Group 13. The bonding conditions were the same as in Example 17.

PVF film after the surface modification. Further, at the time of bonding, a synthetic rubber-based adhesive (trade name; ThreeBond 1521, manufactured by ThreeBond Co., Ltd.) was applied to the modified PVF film and a PET film, respectively, and the bonding was performed by compression bonding at a bonding temperature of 25° C. under a pressure of 2.5 kPa for 24 hours. A laminated film according to this Example was produced in the same manner as Example 1 except for the above procedure.

TABLE 1

| | Halide of Group 13 | Resin Film | Kind of Solvent for Halide Complex of Group 13 | Concentration (wt %) of Halide of Group 13 | Solution Temperature (° C.) of Halide Complex of Group 13 | Immersion Time | Kind of the Other Resin Film | Kind of Adhesive | Peel Strength (N/cm) |
|---|---|---|---|---|---|---|---|---|---|
| Example 1 | $BF_3$ | PVF | $H_2O$ | 71 | 25 | 10 min | EVA (White) | None | 11.4 |
| Example 2 | $BF_3$ | PVF | $H_2O$ | 71 | 25 | 60 sec | EVA (White) | None | 15.5 |
| Example 3 | $BF_3$ | PVF | $H_2O$ | 71 | 25 | 30 sec | EVA (White) | None | 2.2 |
| Example 4 | $BF_3$ | PVF | $H_2O$ | 71 | 25 | 10 sec | EVA (White) | None | 1.7 |
| Example 5 | $BF_3$ | PVF | $H_2O$ | 65 | 25 | 4 h | EVA (White) | None | 23.7 |
| Example 6 | $BF_3$ | PVF | $H_2O$ | 65 | 25 | 60 sec | EVA (White) | None | 1.8 |
| Example 7 | $BF_3$ | PVF | $H_2O$ | 60 | 25 | 5 h | EVA (White) | None | 4.6 |
| Example 8 | $BF_3$ | PVF | $H_2O$ | 50 | 25 | 5 h | EVA (White) | None | 1.6 |
| Example 9 | $BF_3$ | PVF | THF | 45 | 15 | 24 h | EVA (White) | None | 1.6 |
| Example 10 | $BF_3$ | PVF | THF | 45 | 25 | 24 h | EVA (White) | None | 2.9 |
| Example 11 | $BF_3$ | PVF | THF | 45 | 45 | 24 h | EVA (White) | None | 6.1 |
| Example 12 | $BF_3$ | PVF | PhOH | 30 | 25 | 24 h | EVA (White) | None | 2.5 |
| Example 13 | $BF_3$ | PVF | $CH_3CN$ | 63 | 25 | 5 h | EVA (White) | None | 4.8 |
| Example 14 | $BF_3$ | PVF | EtOH | 60 | 25 | 5 h | EVA (White) | None | 4.5 |
| Comparative Example 1 | Untreated | PVF | — | — | — | — | EVA (White) | None | 1.4 |
| Example 15 | $BF_3$ | PVF | $H_2O$ | 71 | 25 | 60 sec | EVA (40KR) | None | 18.3 |
| Example 16 | $BF_3$ | PVF | $H_2O$ | 65 | 25 | 60 sec | EVA (40KR) | None | 2.9 |
| Comparative Example 2 | Untreated | PVF | — | — | — | — | EVA (40KR) | None | 0.3 |
| Example 17 | $BF_3$ | PVF | $H_2O$ | 71 | 25 | 10 sec | EVA (45FR) | None | 16.8 |
| Example 18 | $BF_3$ | PVF | $H_2O$ | 65 | 25 | 60 sec | EVA (45FR) | None | 3.2 |
| Example 19 | $BF_3$ | PVF | $H_2O$ | 71 | 25 | 30 sec | EVA (45FR) | None | >40 |
| Comparative Example 3 | Untreated | PVF | — | — | — | — | EVA (45FR) | None | 0.3 |

Example 20

In Example 20, surface modification of the PVF film was carried out under the conditions shown in Table 2 below. In addition, polyvinyl butyral (PVB) film (trade name; TROSIFOL SOLAR R40, manufactured by Kuraray Co., Ltd., 760 μm in thickness) was used as a film to be bonded to the PVF film after the surface modification. A laminated film according to this Example was produced in the same manner as Example 1 except for the above procedure.

Comparative Example 4

In Comparative Example 4, a laminated film was produced by bonding the PVF film to an untreated PVB film without carrying out the surface modification with a halide complex of an element in Group 13. The bonding conditions were the same as in Example 20.

Example 21

In Example 21, surface modification of the PVF film was performed under the conditions shown in Table 2 below. In addition, polyethylene terephthalate (PET) film (manufactured by Toray Industries, Ltd., trade name; LUMIRROR S-10, thickness; 50 μm) was used as a film to be bonded to the Comparative Example 5

In Comparative Example 5, a laminated film was produced by bonding the PVF film to an untreated PET film without carrying out the surface modification with a halide complex of an element in Group 13. The bonding conditions were the same as in Example 21.

Example 22

In Example 22, a laminated film according to this Example was produced in the same manner as Example 21, except that an urethane-based adhesive (trade name; Pando 156A, manufactured by ThreeBond Co., Ltd.) was used as an adhesive in the bonding between the PVF film after the surface modification and the PET film.

Comparative Example 6

In Comparative Example 6, a laminated film was produced by bonding the PVF film to an untreated PET film without carrying out the surface modification with a halide complex of an element in Group 13. The bonding conditions were the same as in Example 22.

Example 23

In Example 23, a laminated film according to this Example was produced in the same manner as Example 21, except that a mixture of a polyester-based adhesive (model; LX703VL, manufactured by DIC Corp.) and a polyisocyanate curing agent (model; KR90, manufactured by DIC Corp.) was used as an adhesive in the bonding between the PVF film after the surface modification and the PET film.

Comparative Example 7

In Comparative Example 7, a laminated film was produced by bonding the PVF film to an untreated PET film without carrying out the surface modification with a halide complex of an element in Group 13. The bonding conditions were the same as in Example 23.

Examples 24 to 28

Laminated films according to Examples 24 to 28 were produced in the same manner as Example 1 described above, except that various films shown in Table 2 below were used as a resin film to be surface-modified and that the surface modification was performed under the conditions as shown in Table 2.

Comparative Examples 8 to 12

In Comparative Examples 8 to 12, laminated films were produced by bonding the resin film shown in Table 2 below to the other resin film (untreated) shown in Table 2 below without carrying out the surface modification with a halide complex of an element in Group 13. The bonding conditions were the same as in Example 24.

Examples 29 to 31

In Examples 29 to 31, laminated films according to Examples 29 to 31 were produced in the same manner as Example 1 described above, except that the halide as shown in Table 2 below was used as a halide complex of an element in Group 13 and the surface modification were performed under the conditions as shown in Table 2.

TABLE 2

| | Halide of Group 13 | Resin Film | Kind of Solvent for Halide Complex of Group 13 | Concentration (wt %) of Halide of Group 13 | Solution Temperature (° C.) of Halide Complex of Group 13 | Immersion Time | Kind of the Other Resin Film | Kind of Adhesive | Peel Strength (N/cm) |
|---|---|---|---|---|---|---|---|---|---|
| Example 20 | BF$_3$ | PVF | H$_2$O | 71 | 25 | 60 sec | PVB | None | 0.2 |
| Comparative Example 4 | Untreated | PVF | — | — | — | — | PVB | None | 0.1 |
| Example 21 | BF$_3$ | PVF | H$_2$O | 71 | 25 | 60 sec | PET | Synthetic Rubber-based | 8.3 |
| Comparative Example 5 | Untreated | PVF | — | — | — | — | PET | Synthetic Rubber-based | 3.3 |
| Example 22 | BF$_3$ | PVF | H$_2$O | 71 | 25 | 60 sec | PET | Urethane-based | 21.1 |
| Comparative Example 6 | Untreated | PVF | — | — | — | — | PET | Urethane-based | 3.5 |
| Example 23 | BF$_3$ | PVF | H$_2$O | 71 | 25 | 60 sec | PET | Polyester + Polyisocyanate Curing Agent | 9.1 |
| Comparative Example 7 | Untreated | PVF | — | — | — | — | PET | Polyester + Polyisocyanate Curing Agent | 4.2 |
| Example 24 | BF$_3$ | PVDF | H$_2$O | 71 | 25 | 60 sec | PVB | None | 0.2 |
| Comparative Example 8 | Untreated | PVDF | — | — | — | — | PVB | None | 0.1 |
| Example 25 | BF$_3$ | PI | H$_2$O | 71 | 25 | 60 sec | EVA (White) | None | 5.2 |
| Comparative Example 9 | Untreated | PI | — | — | — | — | EVA (White) | None | 5.1 |
| Example 26 | BF$_3$ | PET | H$_2$O | 71 | 25 | 60 sec | PET | Urethane-based | 17.5 |
| Comparative Example 10 | Untreated | PET | — | — | — | — | PET | Urethane-based | 9.0 |
| Example 27 | BF$_3$ | ETFE | H$_2$O | 71 | 25 | 60 sec | EVA (White) | None | 0.1 |
| Comparative Example 11 | Untreated | ETFE | — | — | — | — | EVA (White) | None | <0.1 |
| Example 28 | BF$_3$ | FEP | H$_2$O | 71 | 25 | 60 sec | EVA (White) | None | 0.1 |
| Comparative Example 12 | Untreated | FEP | — | — | — | — | EVA (White) | None | <0.1 |
| Example 29 | BCl$_3$ | PVF | THF | 50 | 25 | 60 sec | EVA (White) | None | 2.8 |
| Example 30 | BBr$_3$ | PVF | THF | 50 | 25 | 60 sec | EVA (White) | None | 2.0 |
| Example 31 | InCl$_3$ | PVF | H$_2$O | 50 | 25 | 60 sec | EVA (White) | None | 2.5 |

Examples 32 to 35

In Examples 32 to 35, laminated films according to Examples 32 to 35 were produced in the same manner as Example 17 described above, except that an $AlCl_3$ complex was used as the halide complex of an element in Group 13 and that the surface modification was performed under the conditions as shown in Table 3.

Comparative Example 13

In Comparative Example 13, a laminated film was produced by bonding the PVF film to an untreated EVA film for solar cells without carrying out the surface modification with a halide complex of an element in Group 13. The bonding conditions were the same as in Example 32 the measurement limit for peel evaluation was 40 N/cm, it was impossible to detect a laminated film having a peel strength exceeding 40 N/cm.

(Results)

As can be seen from Table 1 above, when the surface modification was carried out in Examples 1 to 14 by bringing the $BF_3$ complex into contact with the PVF film, the peel strength of the EVA film could be more increased in comparison with Comparative Example 1 wherein the surface modification had not been carried out. Further, in Examples 15 to 19, the peel strength of the EVA film for solar cells could be more increased in comparison with Comparative Example 2 and 3. Moreover, as for Example 19, the peel strength exceeding 40 N/cm was maintained even in a laminated film produced from the treated PVF film that had been stored at room

TABLE 3

| | Halide of Group 13 | Resin Film | Kind of Solvent for Halide Complex of Group 13 | Concentration (wt %) of Halide of Group 13 | Solution Temperature (° C.) of Halide Complex of Group 13 | Immersion Time | Kind of the Other Resin Film | Kind of Adhesive | Peel Strength (N/cm) |
|---|---|---|---|---|---|---|---|---|---|
| Example 32 | $AlCl_3$ | PVF | EtOH | 25 | 85 | 10 min | EVA (45FR) | None | 2.0 |
| Example 33 | $AlCl_3$ | PVF | EtOH | 50 | 120 | 5 min | EVA (45FR) | None | 13.7 |
| Example 34 | $AlCl_3$ | PVF | EtOH | 70 | 110 | 5 min | EVA (45FR) | None | >40 |
| Example 35 | $AlCl_3$ | PVF | EtOH | 70 | 25 | 1 min | EVA (45FR) | None | >40 |
| Comparative Example 13 | Untreated | PVF | — | — | — | — | EVA (45FR) | None | 0.3 |

Comparative Examples 14 to 17

In Comparative Examples 14 to 17, laminated films were produced in the same manner as Example 17 described above, except that the halide as shown in Table 4 below was used in place of the halide complex of an element in Group 13 and that the surface modification was performed under the conditions as shown in Table 4 below.

temperature for one year or in a laminated film that had been produced immediately after the treatment and stored at room temperature for one year.

Also, as can be seen from Table 2 above, when the surface modification was carried out in Examples 20 to 23 by bringing the $BF_3$ complex into contact with the PVF film, and the surface-modified film was bonded to the other resin film with an adhesive interposed therebetween, the peel strength could

TABLE 4

| | Halide | Resin Film | Kind of Solvent for Halide Complex | Concentration (wt %) of Halid | Solution Temperature (° C.) of Halide Complex | Immersion Time | Kind of the Other Resin Film | Kind of Adhesive | Peel Strength (N/cm) |
|---|---|---|---|---|---|---|---|---|---|
| Comparative Example 14 | $MgCl_2$ | PVF | EtOH | 29 | 40 | 5 min | EVA (45FR) | None | 0.3 |
| Comparative Example 15 | $CaCl_2$ | PVF | EtOH | 39 | 25 | 5 min | EVA (45FR) | None | 0.2 |
| Comparative Example 16 | $CeCl_3$ | PVF | EtOH | 41 | 25 | 5 min | EVA (45FR) | None | 0.2 |
| Comparative Example 17 | LiCl | PVF | EtOH | 30 | 40 | 5 min | EVA (45FR) | None | 0.2 |

(Peel Test)

Peel tests on the laminated films produced in the respective Examples and Comparative Examples were performed by measuring the peel adhesive force (peel strength) when the resin film after the surface modification was peeled off from the other untreated resin film. In the case where an adhesive was used, the peel adhesive force (peel strength) when the surface-modified film was peeled off from the PET film was measured. The peel test was performed according to JIS K6854-1 (peel at 90°) under the conditions of temperature: 25° C.; relative humidity (Rh): 20 to 50%; grip moving speed: 50 mm/min; and width of laminated film sample: 1 cm. Since be more increased in comparison with Comparative Examples 4 to 7 wherein the surface modification had not been carried out. Further, when the surface modification was carried out in Examples 24 to 28 by bringing various resin films other than the PVF film into contact with the $BF_3$ complex, the peel strength could be more increased in comparison with each of Comparative Examples 8 to 12.

Furthermore, when surface modification of the PVF film was carried out in Examples 29 to 31 using a $BCl_3$ complex, a $BBr_3$ complex, an $InCl_3$ complex etc., even these complexes could increase the peel strength of the EVA film compared with Comparative Example 1.

In addition, as can be seen from Table 3 and Table 4 above, surface modification of the PVF film was carried out in Examples 32 to 35 using an AlCl$_3$ complex, and even the AlCl$_3$ complex could increase the peel strength of the EVA film compared with Comparative Examples 14 to 17 wherein the halide complex of an element in Group 13 had not been used.

DESCRIPTION OF REFERENCE CHARACTERS

1 Surface-Modified Film
2 The Other Resin Film
3 Adhesive
4 Resin Film
10 Laminated Film
11 Laminated Film
12 Solar Cell Backsheet

The invention claimed is:

1. A process for producing a surface-modified film, which is characterized by:
preparing a halide complex of an element in Group 13 of the periodic table by mixing an oxide of an element in Group 13 with a hydrogen halide or by contacting an anhydrous halide gas of an element in Group 13 with a solvent composed of a compound having a nucleophilic site in the molecule or by mixing an anhydrous liquid or solid halide of an element in Group 13 with a solvent composed of a compound having a nucleophilic site in the molecule;
bringing the halide complex of an element in Group 13 of the periodic table into contact with at least a part of a region in the surfaces of a resin film; and
washing the resin film with a washing solution at a temperature which is no lower than a melting point of the washing solution, no higher than a boiling point of the washing solution, and no higher than a heat-resistant temperature of the resin film, thereby to produce a surface-modified film having adhesive properties improved in a part of the region in the surfaces.

2. The process according to claim 1, further comprising, after the washing step, drying the resin film by blowing nitrogen gas onto the surface thereof.

3. The process according to claim 2, further comprising, after the nitrogen gas drying step, further drying the surface under reduced pressure of 10 Pa or less at room temperature.

4. The process according to claim 1, wherein the washing step is conducted by immersing the resin film in the washing solution for one second to two hours.

5. The process according to claim 1, wherein the halide complex is in liquid form before contacting the surface of the resin film.

* * * * *